(12) United States Patent
Mehta

(10) Patent No.: US 12,157,461 B2
(45) Date of Patent: Dec. 3, 2024

(54) SYSTEM AND METHOD FOR LIMITING MOBILE PHONE USE BY DRIVERS

(71) Applicant: PRANA ENTERPRISE PTY LTD, Rothwell (AU)

(72) Inventor: Dilip Jehtala Mehta, Ferny Hills (AU)

(73) Assignee: PRANA ENTERPRISE PTY LTD, Rothwell (AU)

( * ) Notice: Subject to any disclaimer, the term of this patent is extended or adjusted under 35 U.S.C. 154(b) by 146 days.

(21) Appl. No.: 17/615,039

(22) PCT Filed: May 29, 2020

(86) PCT No.: PCT/AU2020/050544
§ 371 (c)(1),
(2) Date: Nov. 29, 2021

(87) PCT Pub. No.: WO2020/237318
PCT Pub. Date: Dec. 3, 2020

(65) Prior Publication Data
US 2022/0219681 A1    Jul. 14, 2022

(30) Foreign Application Priority Data
May 29, 2019    (AU) ................ 2019901843

(51) Int. Cl.
*B60W 30/08*    (2012.01)
*B60W 40/09*    (2012.01)
(Continued)

(52) U.S. Cl.
CPC ............ *B60W 30/08* (2013.01); *B60W 40/09* (2013.01); *H04M 1/72463* (2021.01);
(Continued)

(58) Field of Classification Search
CPC ........ B60W 30/08; B60W 30/09; H04W 4/80; H04W 4/40; H04M 1/72463
(Continued)

(56) References Cited

U.S. PATENT DOCUMENTS 8,204,649 B2    6/2012    Zhou et al.
9,769,309 B1    9/2017    Durham
(Continued)

OTHER PUBLICATIONS

Transmittal of International Preliminary Report on Patentability mailed on Aug. 10, 2021, for International Application No. PCT/AU2020/050544, filed May 29, 2020, pp. 5.
(Continued)

*Primary Examiner* — Peter D Nolan
*Assistant Examiner* — Luke Huynh
(74) *Attorney, Agent, or Firm* — WOMBLE BOND DICKINSON (US) LLP

(57) ABSTRACT

A system for limiting use of an electronic mobile device by a driver of a vehicle. The system includes a mobile device controller for removable connection with a vehicle and for wireless communicating with one or more electronic mobile devices and an electronic mobile device for wireless communicating with the mobile device controller. The mobile device controller comprises a radio frequency receiver or transmitter. The electronic mobile device includes a radio frequency transceiver in wireless communication with the radio frequency receiver or transmitter of the mobile device controller, an application installed thereon and an electronic mobile device processor programmed to execute one or more instructions of the application stored in a non-transitory computer readable storage medium of the electronic mobile device.

14 Claims, 5 Drawing Sheets

(51) Int. Cl.
H04M 1/72463 (2021.01)
H04W 4/40 (2018.01)
H04W 4/80 (2018.01)

(52) U.S. Cl.
CPC ............... *H04W 4/40* (2018.02); *H04W 4/80* (2018.02); *B60W 2540/215* (2020.02); *B60W 2540/229* (2020.02); *H04M 1/724631* (2022.02)

(58) Field of Classification Search
USPC .............................................................. 701/1
See application file for complete search history.

(56) References Cited

U.S. PATENT DOCUMENTS

| | | |
|---|---|---|
| 2010/0167691 A1 | 7/2010 | Howarter et al. |
| 2011/0021234 A1* | 1/2011 | Tibbitts ................... H04W 8/22 455/517 |
| 2013/0337763 A1 | 12/2013 | Shyamalan |
| 2019/0082377 A1* | 3/2019 | Silver ..................... H04W 4/40 |

OTHER PUBLICATIONS

Transmittal of the International Search Report and Written Opinion of the International Searching Authority mailed on Jun. 26, 2020, for International Application No. PCT/AU2020/050544, filed May 29, 2020, pp. 9.

\* cited by examiner

SYSTEM AND METHOD FOR LIMITING MOBILE PHONE USE BY DRIVERS

CROSS-REFERENCE TO RELATED APPLICATION

This patent application is a U.S. National Phase Application under 35 U.S.C. § 371 of International Application No. PCT/AU2020/050544, filed 29 May 2020, which claims the benefit of Australia Patent Application No.: 2019901843, filed 29 May 2019, which are hereby incorporated by reference in their entirety.

FIELD OF THE INVENTION

The present invention relates to a system and method for limiting or preventing mobile phone use by a driver while driving a vehicle.

BACKGROUND

Any references to methods, apparatus or documents of the prior art are not to be taken as constituting any evidence or admission that they formed, or form, part of the common general knowledge.

Using a mobile phone (such as, texting, messaging and phone calls) while driving is known to be a significant contributor to and cause of traffic accidents.

Around the world, thousands of drivers, passengers and pedestrians are injured or lose their lives due to mobile phone use while driving.

The practice of using a mobile phone with your hands has been banned in many countries to address this problem. However, it is difficult for police and law enforcement to monitor such use amongst their various other duties.

While governments invest considerable time and money into developing campaigns to dissuade drivers from using their mobile phones while driving, and law enforcement imposes significant penalties for individuals caught using their phones while driving, the dangerous practice continues.

Simply banning the handheld use of mobile phones while driving and imposing financial penalties appears to have proven insufficient.

Thus, there is a need for a way to limit or prevent drivers from using their mobile phones while driving.

OBJECT OF THE INVENTION

It is an aim of this invention to provide a system for limiting or preventing use of a mobile phone by driver while driving which overcomes or ameliorates one or more of the disadvantages or problems described above, or which at least provides a useful commercial alternative.

Other preferred objects of the present invention will become apparent from the following description.

SUMMARY OF THE INVENTION

According to a first embodiment of the present invention there is provided a system for limiting use of an electronic mobile device by a driver of a vehicle, the system comprising:
  a mobile device controller for removable connection with a vehicle and for wireless communicating with one or more electronic mobile devices, the mobile device controller comprising a radio frequency receiver or transmitter; and
  a electronic mobile device for wireless communicating with the mobile device controller, the electronic mobile device comprising:
    an application installed thereon;
    a radio frequency transceiver in wireless communication with the radio frequency receiver or transmitter of the mobile device controller;
    an electronic mobile device processor programmed to execute one or more instructions of the application stored in a non-transitory computer readable storage medium of the electronic mobile device, wherein the instructions comprise:
      temporarily disabling radio frequency signal transmission of the electronic mobile device;
      requesting an input via the one or more electronic mobile devices that satisfies a predetermined criterion;
      receiving the input that satisfies the predetermined criterion from at least one of the one or more electronic mobile devices; and
      restoring radio frequency signal transmission of the at least one of the one or more electronic mobile devices.

According to another embodiment of the present invention, there is provided a method for limiting use of a electronic mobile device by a driver of a vehicle, the method including the steps of:
  wirelessly associating one or electronic mobile devices with a mobile device controller;
  temporarily disabling radio frequency signal transmission of the one or more electronic mobile devices;
  requesting an input via the one or more electronic mobile devices that satisfies a predetermined criterion;
  receiving the input that satisfies the predetermined criterion from at least one of the one or more electronic mobile devices; and
  restoring radio frequency signal transmission of the at least one of the one or more electronic mobile devices.

Preferably, the mobile device controller comprises a Bluetooth device. Preferably, the Bluetooth device is a Bluetooth transceiver.

Preferably, the mobile device controller comprises a Radio-Frequency Identifier (RFID). Preferably, the RFID comprises an RFID tag. Preferably, the RFID tag is an active RFID tag or a passive RFID tag. Preferably, the RFID tag comprises a High Frequency (HF) RFID NFC tag.

Preferably, the mobile device controller is connected to an Onboard-Diagnostics (OBD) port of a vehicle. Preferably, the OBD port of the vehicle is an OBD-II port. Preferably, the mobile device controller reads a vehicle status code of the vehicle. Preferably, the vehicle status code is transmitted or read by the electronic mobile device in wireless communication with the mobile device controller. Preferably, the vehicle status code initiates the execution of the instructions stored on the electronic mobile device.

Preferably, the mobile device controller is adapted to connect to an Onboard-Diagnostics (OBD) port of a vehicle. Preferably, the OBD port of the vehicle is an OBD-II port. Preferably, the mobile device controller is adapted to read a vehicle status code of the vehicle from the OBD port. Preferably, the vehicle status code is transmitted or read by the electronic mobile device in wireless communication with the mobile device controller. Preferably, the vehicle status code initiates the execution of the instructions stored on the electronic mobile device.

Preferably, the method further comprises the step of detecting the vehicle has been turned on before wirelessly associating one or more electronic mobile devices with the mobile device controller.

Preferably, the predetermined criterion comprises a confirmation from a user of the electronic mobile device.

Preferably, the step of restoring radio frequency signal transmission comprises only restoring Bluetooth signal transmission.

Preferably, the system further comprises a passenger RFID device.

Preferably, the method further comprises the step of monitoring the movement of the electronic mobile device. Preferably, the step of monitoring comprises reading one or more inertial sensors of the electronic mobile device. Preferably, in response to detecting movement of the electronic mobile device over a predetermined threshold, input to the electronic mobile device is restricted or disabled. Preferably disabling or restricting input to the electronic mobile device comprises disabling input via the display or buttons of the electronic mobile device. In some embodiments, in response to detecting movement of the electronic mobile device, a warning or alert is issued from the electronic mobile device. Preferably, the alert may be in the form of an audio alert. Suitably, the audio alert may take the form of a voice recording.

Preferably, the predetermined criterion comprises presence of a Bluetooth connection to a handsfree system of the vehicle.

In another embodiment, the invention resides in a system for limiting use of an electronic mobile device by a driver while driving, the system comprising:
an electronic mobile device having an application installed thereon; and
a mobile device controller installed within a vehicle,
wherein the mobile device controller communicates with the electronic mobile device when the electronic mobile device is within wireless range of the mobile device controller and, in response, the application disables radio frequency signal transmission from the electronic mobile device while the vehicle remains in operation.

Preferably, the application is always active on the electronic mobile device.

Preferably, the mobile device controller is installed or located on a steering column or dashboard of the vehicle.

Preferably, the system further comprises a vehicle.

Further features and advantages of the present invention will become apparent from the following detailed description.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE PREFERRED EMBODIMENTS

The invention relates to a method and system for limiting mobile phone use by a driver of a vehicle while the vehicle is turned on.

Further to the above, embodiments of the invention are directed to a system and method for prevention of texting or messaging by a driver of a vehicle. The system includes a software application (that is preferably always on or always active) that is installed on a driver's smartphone or similar electronic mobile device, and a mobile device controller which is preferably located on the steering column or dashboard of the driver's vehicle, or built-in to the vehicle's existing componentry. Preferably, the mobile device controller is located in the vehicle such that the driver will always be within range of the device (e.g. in range of the RFID tag) but any passengers will not be within range of the device.

In use, the mobile device controller interfaces or communicates with the smartphone (or other device) when the vehicle is powered on (preferably by at least turning the key to the "accessories" switch) which provides power to the mobile device controller. In response to interfacing or communicating with the mobile device controller, the software application is configured to enable "airplane mode" (i.e. disable all outgoing and incoming wireless communication systems such as cellular radios, etc, for example) on the smartphone. In some embodiments, the software application may limit use of specific features and functionalities of the mobile phone (for example, disabling the touch screen or keyboard).

In some embodiments the mobile device controller may be powered by a battery rather than the vehicle itself.

The radio frequency signal transmission of the smartphone can be re-enabled by the user confirming that the smartphone is to be used in "handsfree mode". In some embodiments, the software application will then monitor the movement of the smartphone (through the use of inertial sensors located within the smartphone) and disable the radio frequency signal transmission of the smartphone or limit or prevent input through the touchscreen display or buttons to limit and/or prevent illegal use of the smartphone. In some embodiments, in response to detecting movement of the electronic mobile device, a warning or alert is issued from the electronic mobile device. The alert may be in the form of an audio alert, such as a voice recording instructing whoever has picked up the device (either the driver or a passenger, for example) to return the device to its original position.

Figure 1:
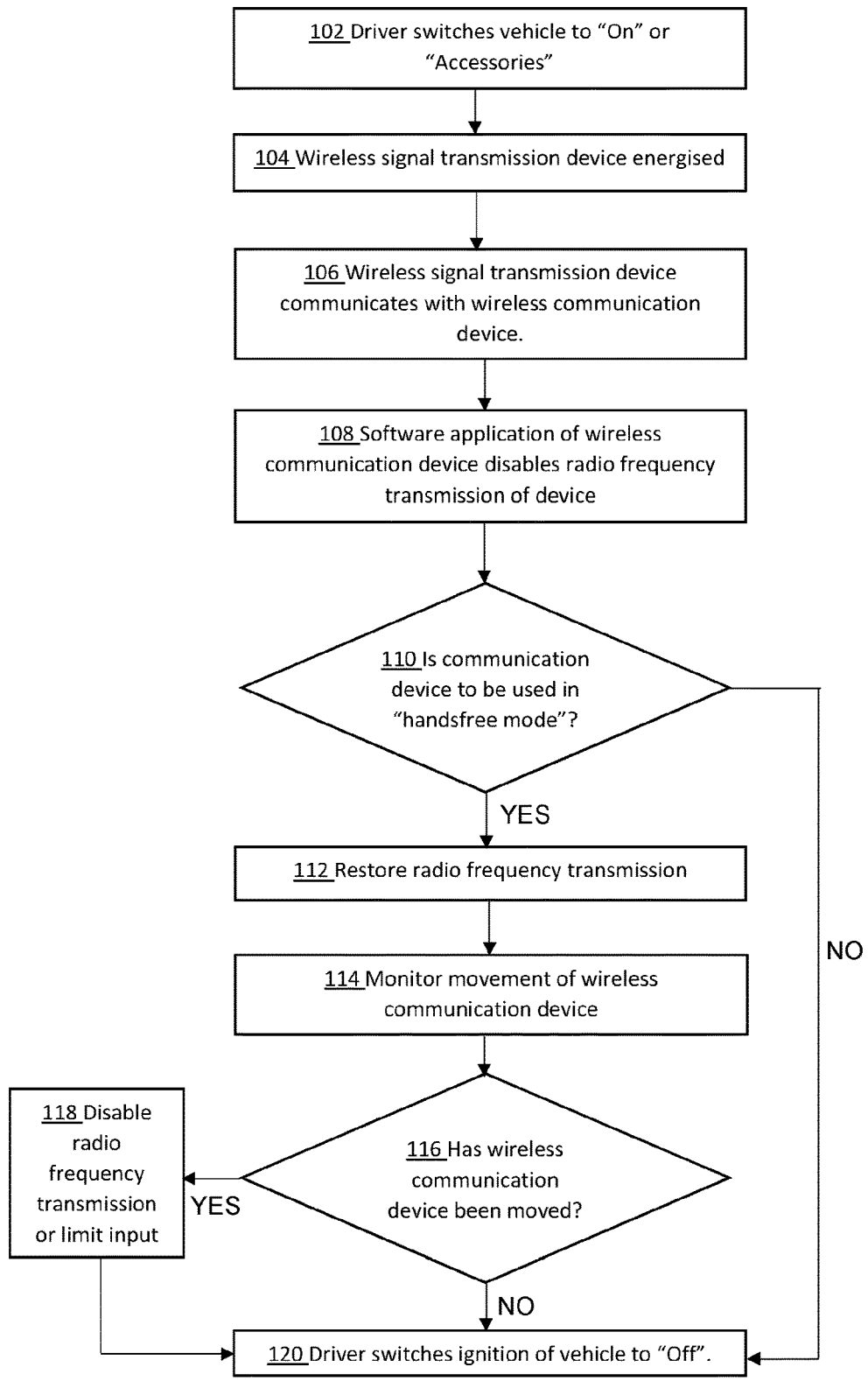
FIG. 1 illustrates a flow chart of a method for limiting or preventing use of a mobile phone by a driver while driving a vehicle.

FIG. 1 shows a flow diagram for the steps of a method for limiting the use of a mobile phone by a driver of a vehicle.

In Step 102, a driver turns a vehicle on, either to the "Accessories" or "Ignition" switch of the vehicle.

In Step 104, the starting of the vehicle energises or otherwise activates a mobile device controller located in the vehicle. The mobile device controller is such that it is able to wirelessly interface or communicate with a mobile phone or similar wireless communication device. In this regard, the mobile device controller is preferably a Bluetooth transceiver or Radio-Frequency Identification (RFID) tag.

In Step 106, the mobile device controller interfaces or otherwise communicates with the mobile phone of the driver. The mobile phone (or similar device) has a software application or mobile application installed thereon. This software application is programmed to recognise communication with the mobile device controller and execute a series of instructions stored in non-transitory computer readable media located within the mobile phone. The software application is also programmed to control a number of features and functionalities of the phone which will become clear from the following description.

In Step 108, the software application, in response to communication with the mobile device controller, suspends radio-frequency signal transmission by the mobile phone (e.g. places the mobile phone into "airplane mode"), thereby disabling Near-Field Communication (NFC), Wi-Fi, telephony and Bluetooth functionality and devices. In some embodiments, the software application may be programmed to maintain either or both Bluetooth and NFC functionality.

In Step 110, the driver, before beginning to drive the vehicle, is prompted by the software application via the mobile phone display to confirm that the phone is to be used in "handsfree mode."

In Step 112, in response to receiving a confirmation from the driver that the mobile phone is to be used in "handsfree mode", the software application restores radio-frequency signal transmission for the mobile phone (e.g. disables airplane mode). In some embodiments, the software application may restore radio frequency signal transmission but limit or disable input via the touchscreen or buttons of the mobile phone to prevent driver use while driving. This would allow a driver to observe directions provided by a navigation application or answer calls through the use of a handsfree system of the vehicle but prevent them from texting or conducting other activities through the display of the mobile phone.

If no confirmation is received, the mobile phone remains in airplane mode unless the driver elects to re-enable the various features and functionalities that have been disabled. In some embodiments, the software application may be programmed not to allow reinstatement of the radio signal frequency signal transmission by the mobile phone until either a confirmation is received or the vehicle is turned off, thereby de-energising the mobile device controller in the vehicle.

In Step 114, the software application monitors the movement of the mobile phone using in-built mobile device controllers of the mobile phone. Primarily, the software application will take readings from a motion detecting system of the mobile phone including an accelerometer, a magnetometer and a gyroscope of the mobile phone to monitor the movement of the mobile phone.

In Step 116, the software application determines whether the mobile phone has been picked up. In response, if the mobile phone is determined to have been picked up, in Step 418, the software application may either disable radio-frequency signal transmission or limit or disable input into the mobile phone (e.g. disable the touch screen/display or keyboard) until the mobile phone is put down or docked in a suitable holster or cradle in the vehicle, for example. Alternatively, in response to detecting movement of the electronic mobile device, a warning or alert is generated by the software application and issued. The alert may be in the form of an audio alert, such as a voice recording, instructing whoever moved the mobile phone to return the mobile phone to its original position (e.g. a handsfree cradle).

In Step 120, the software application checks whether the driver has turned off the vehicle.

If not, no response is required. If the vehicle has been turned off, the software application reinstates or reactivates all radio-frequency signal transmissions and functionality of the mobile phone and suspends monitoring the movement of the mobile phone.

Figure 2:
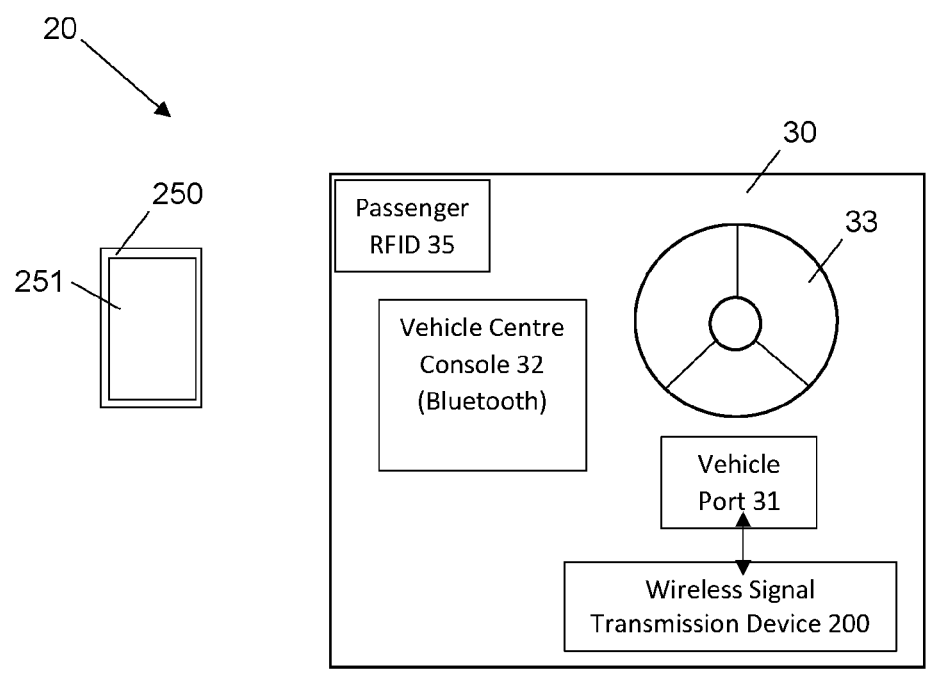
FIG. 2 illustrates a system for limiting or preventing use of a mobile phone by a driver while driving a vehicle.

In the illustrated embodiment shown in FIG. 2, there is a system 20 including a mobile device controller 200 in the form of a radio frequency transmitter/receiver (also referred to herein as a mobile device controller), typically in the form of either a Bluetooth device 300 (see FIG. 3) or RFID tag 400 (see FIG. 4) and an electronic mobile device in the form of a mobile phone 250 having a display 251. In the illustrated embodiment, the RFID tag 400 takes the form of a High Frequency RFID tag but could be any type of RFID tag.

System 20 shows the mobile device controller 200 connected to vehicle 30 (which is a typical motor vehicle) having a vehicle port 31 (preferably an OBD-II port or similar) and a vehicle centre console 32 having built-in Bluetooth capabilities. As can be seen, the vehicle port 31 is typically below the steering wheel 33.

System 20 may also include a passenger RFID 35 in the form of a passive RFID tag that is preferably mounted to the dashboard or storage compartment on the passenger seat side of the vehicle 30.

The passenger RFID 35 performs a similar function to the mobile device controller 200 described herein. In use, a passenger having a mobile phone (similar to mobile phone 250 having an app installed thereon) would use an RFID reader of the mobile phone to read the passenger RFID 35 which would invoke the method 100 described above. This seeks to limit any distraction to a driver caused by a passenger using mobile device.

Figure 3:
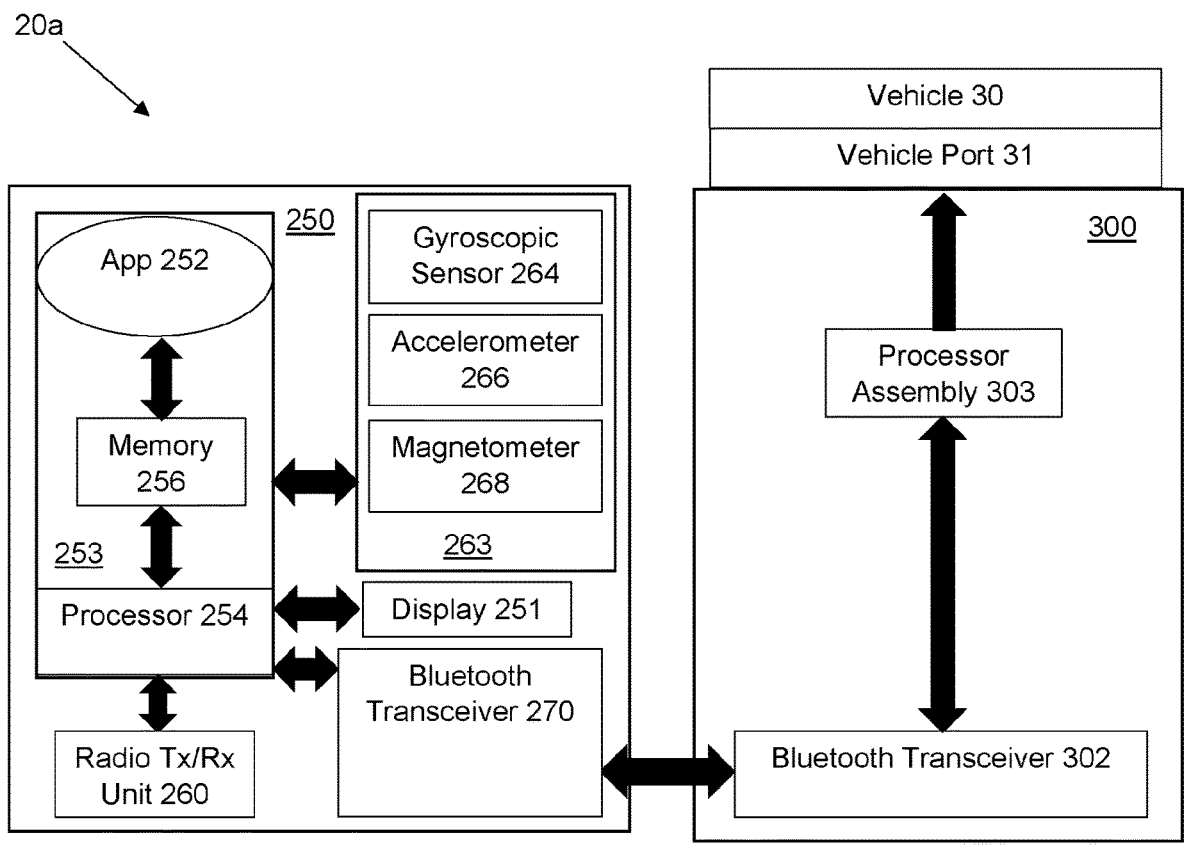
FIG. 3 illustrates a block diagram of an embodiment of the system shown in FIG. 2, the system having a mobile device controller in the form of a Bluetooth transceiver.

FIG. 3 illustrates a block diagram of the system 20a (which is substantially similar to system 20) of the Bluetooth device 300 connected to the vehicle 30 and the mobile phone 250.

The mobile phone 250 has a software application (App 252) installed thereon for executing a method in accordance with the steps described above. These steps are stored in non-transitory computer readable media or storage and are executable by the software application when certain conditions or criteria (as set out above) are satisfied.

The mobile phone 250 comprises a microcontroller board 253 which includes a processor 254 that accesses a digital memory 256 that stores app 258 containing instructions to execute the steps of method 100 detailed above.

The microcontroller board 253 also operates radio communications Tx/Rx unit 260 to establish radio communications with a cellular network (not shown) for cellular communication.

The mobile phone 250 also includes a motion detecting system 261 in communication with microcontroller board 253. The motion detecting system 263 includes a gyroscopic sensor 264 (such as an electronic gyroscope), an accelerometer 266 and a magnetometer 268.

The mobile 250 also includes a mobile device controller in the form of a Bluetooth transceiver 270 for communicating with a Bluetooth transceiver 302 of Bluetooth device 300.

In the illustrated embodiment in FIG. 3, the Bluetooth device 300 is an aftermarket addition to the vehicle that is installed in a Vehicle Port, such as an On-Board Diagnostics Port (typically an OBD-II Port) that is present in almost all vehicles produced after 1996. Of course, in some alternative embodiments, the Bluetooth device 300 (or other wireless transmission device) is connected to a 12V DC socket present in the vehicle (such as the cigarette lighter socket or dedicated 12V DC outlet). In some other alternative embodiments, the Bluetooth transceiver is built in to the vehicle 30.

In use, the Bluetooth transceiver 302 and processor assembly 303 of Bluetooth device 300 allows the software application 252 to communicate with the Bluetooth transceiver 270 of mobile phone 250 and receive/read a signal indicating that the engine of the vehicle is currently turned on. In some embodiments this may be achieved by reading a status code through the OBD-II port. As described above, in use, the software application 252 running on the mobile phone 250 connects to the Bluetooth transceiver 302 when the driver switches the ignition of the vehicle 30 on (to either the "Accessories" switch or the "Ignition" or "On" switch). The software application 252 may be programmed to automatically detect that the vehicle 30 has been started through the Bluetooth device 300 and disable all radio frequency signal transmission by the mobile phone 250 without requiring the driver to activate the app/Bluetooth transceiver 270 of the mobile phone 250. Usefully, this means that the driver must always use the software application 252 and cannot selectively avoid using the system and methods described herein to allow them to continue to use their mobile phone 250 while driving.

Figure 5:
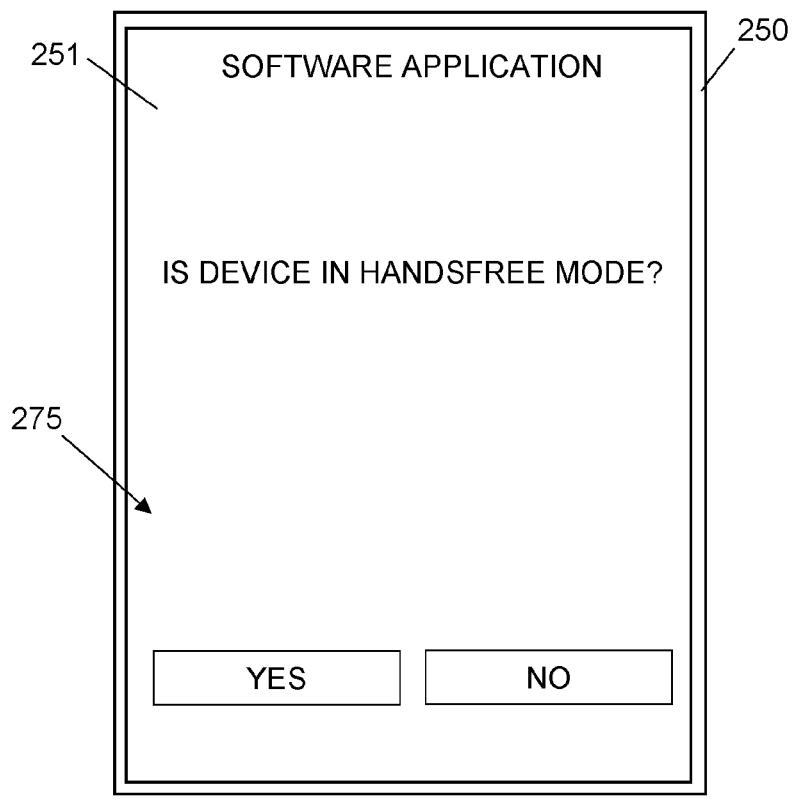
FIG. 5 illustrates a confirmation screen of a software application shown on a display of a mobile phone in accordance with an embodiment of the present invention.

The software application 252 then provides a request for a confirmation 275 through the display 251 of the mobile phone 250 (an example is shown in FIG. 5) to confirm that the mobile phone 250 is to be used in "handsfree mode", preferably through the Bluetooth transceiver 32 built-in to the vehicle 30 if available.

In the illustrated embodiment in FIG. 5, the driver of the vehicle 30 confirms that the mobile phone 250 is to be used in "handsfree mode" for this particular journey by selecting the "YES" button. Alternatively, if the driver wishes for the mobile phone 250 to remain unable to send/receive radio signals, the driver may select the "NO" button on the display 251 or make no selection at all.

Figure 4:
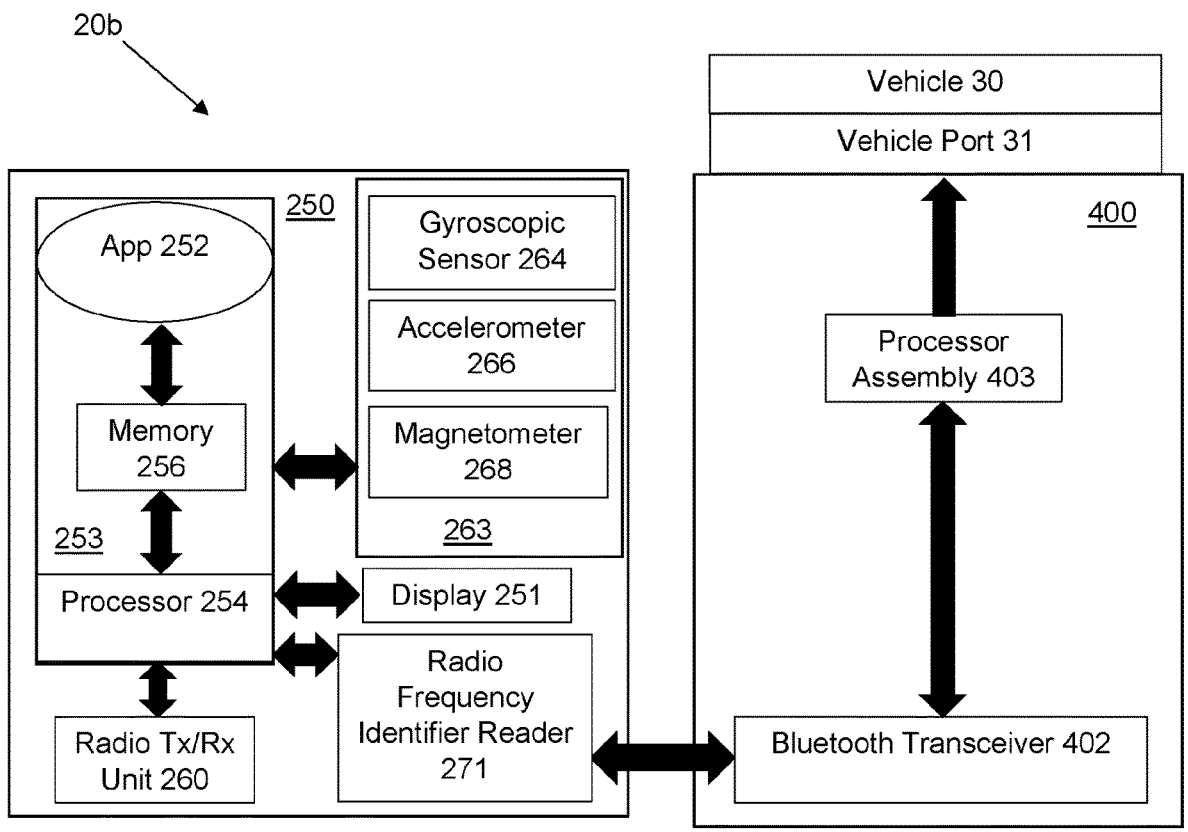
FIG. 4 illustrates a block diagram of another embodiment of the system shown in FIG. 2, the system having a mobile device controller in the form of an RFID tag.

Turning to FIG. 4, which illustrates a system 20b which is a substantially similar alternative embodiment of the system 20a. The embodiment shown replaces the Bluetooth device 300 of system 20a with Radio Frequency Identifier Tag 400.

The mobile phone 250 has a software application (App 252) installed thereon for executing a method in accordance with the steps described above. These steps are stored in non-transitory computer readable media or storage and are executable by the software application 252 when certain conditions or criteria (as set out above) are satisfied.

The mobile phone 250 comprises a microcontroller board 253 which includes a processor 254 that accesses a digital memory 256 that stores app 258 containing instructions to execute the steps of method 100 detailed above.

The microcontroller board 253 also operates radio communications Tx/Rx unit 260 to establish radio communications with a cellular network (not shown) for cellular communication.

The mobile phone 250 also includes a motion detecting system 261 in communication with microcontroller board 253. The motion detecting system 263 includes a gyroscopic sensor 264 (such as an electronic gyroscope), an accelerometer 266 and a magnetometer 268.

The mobile 250 also includes a mobile device controller in the form of a Radio Frequency Identifier (RFID) Reader 271 for communicating with a RFID Tag 402 of RFID device 400. The RFID Tag 402 can comprise either an active RFID tag or a passive RFID tag.

In the illustrated embodiment in FIG. 4, the RFID device 400 is an aftermarket addition to the vehicle 30 that is installed in vehicle port 31, such as an On-Board Diagnostics Port (typically an OBD-II Port) that is present in almost all vehicles produced after 1996. Of course, in some alternative embodiments, the RFID tag 402 (or other wireless transmission device) is connected to a 12V DC socket present in the vehicle (such as the cigarette lighter socket or dedicated 12V DC outlet).

In use, the RFID tag 402 and processor assembly 403 of RFID device 400 allows the software application 252 to communicate with the RFID reader 271 of mobile phone 250 and receive/read a signal indicating that the engine of the vehicle 30 is currently turned on. As described above, in use, the software application 252 running on the mobile phone 250 activates the RFID reader 271 to read RFID tag 402 (if using an active RFID tag) when the driver switches the ignition of the vehicle 30 on (to either the "Accessories" switch or the "Ignition"/"On" switch) and the driver places the mobile phone 250 within communication distance of the RFID tag 402 (typically 30 cm). In an alternative embodiment using a passive RFID tag, the driver would be able to read the RFID tag 402 using mobile phone 250 at any time.

The software application 252 is programmed to detect that the RFID tag 402 has been read and disable all radio frequency signal transmission by the mobile phone 250.

The software application 252 then provides a request for a confirmation 275 through the display 251 of the mobile phone 250 (an example shown in FIG. 5) to confirm that the mobile phone 250 is to be used in "handsfree mode", preferably through the Bluetooth transceiver 32 built in to the vehicle if available.

Advantageously, the systems and methods described herein provide a way to discourage, limit and, in some embodiments, prevent use of a mobile phone (or similar device) by a driver of a vehicle that is currently in use.

In this specification, the terms "wireless communication device", "electronic mobile device" and "mobile phone" are used substantially interchangeably. Wireless electronic mobile device and electronic mobile device is to be understood to refer to a device used to wirelessly receive and transmit signals and data from one or more sources for the purpose of communication or entertainment. Examples of communication or entertainment includes text messages, data-based messaging services, video streaming services and the like.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above detailed description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching.

Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

Throughout the specification and claims (if present), unless the context requires otherwise, the term "substantially" or "about" will be understood to not be limited to the specific value or range qualified by the terms.

The invention claimed is:

1. A system for limiting use of an electronic mobile device by a driver of a vehicle, the system comprising:
    an electronic mobile device;
    a mobile device controller for removable connection with a vehicle and for wireless communication with one or more electronic mobile devices, the mobile device controller comprising a Bluetooth transmitter,
    wherein the Bluetooth transmitter of the mobile device controller is configured to transmit a wireless control signal to the electronic mobile device immediately upon initiation through ignition of the vehicle; and
    the electronic mobile device being configured for wireless communication with the mobile device controller, the electronic mobile device comprising:
        an application installed thereon;
        a Bluetooth transceiver in wireless communication with the Bluetooth transmitter of the mobile device controller;
        an electronic mobile device processor programmed to execute one or more instructions of the application stored in a non-transitory computer readable storage medium of the electronic mobile device, wherein the instructions comprise:
            temporarily disabling radio frequency signal transmission of the electronic mobile device in response to receiving the wireless control signal from the mobile device controller, wherein Bluetooth and Near Field Communication (NFC) functionality of the electronic mobile device is not disabled;
            requesting an input via the one or more electronic mobile devices that satisfies a predetermined criterion, wherein the predetermined criterion comprises detecting the presence of a Bluetooth connection to a handsfree system of a vehicle;
            receiving the input that satisfies the predetermined criterion from at least one of the one or more electronic mobile devices; and
            restoring radio frequency signal transmission of the at least one of the one or more electronic mobile devices;
            monitoring the movement of the electronic mobile device within the vehicle, wherein monitoring comprises reading one or more inertial sensors of the electronic mobile device to determine that the electronic mobile device has been picked up; and
            in response to detecting movement of the electronic mobile device over a predetermined threshold via the one or more inertial sensors, the system further comprises restricting or disabling input to the electronic mobile device, wherein disabling or restricting input to the electronic mobile device comprises disabling input via the display or buttons of the electronic mobile device, and wherein in response to detecting movement of the electronic mobile device, the electronic mobile device issues a warning or alert.

2. The system of claim 1, wherein the mobile device controller comprises a Bluetooth transceiver.

3. The system of claim 2, wherein the mobile device controller further comprises a Radio-Frequency Identifier (RFID) tag.

4. The system of claim 1, the mobile device controller is adapted to connect to an Onboard-Diagnostics (OBD) port of a vehicle.

5. The system of claim 1, wherein the predetermined criterion further comprises a confirmation from a user of the electronic mobile device.

6. The system of claim 1, the system further comprising a passenger RFID device.

7. The system of claim 1, the system further comprising a vehicle, wherein the mobile device controller is removably connected to a OBD port of the vehicle, wherein the OBD port comprises an OBD-II port.

8. The system of claim 7, wherein the mobile device controller is adapted to read a vehicle status code of the vehicle; wirelessly transmit the vehicle status code to the electronic mobile device; and initiate the execution of the instructions stored on the electronic mobile device in response to receiving the vehicle status code.

9. The system of claim 1, wherein the application is always active on the electronic mobile device.

10. The system of claim 1, wherein the mobile device controller is installed or located on a steering column or dashboard of the vehicle.

11. A method for limiting use of an electronic mobile device by a driver of a vehicle, the method including the steps of:
    wirelessly associating one or electronic mobile devices with a mobile device controller via Bluetooth, whereby immediately upon ignition of the vehicle, the mobile device controller transmits a wireless control signal to the electronic mobile device;
    temporarily disabling radio frequency signal transmission of the one or more electronic mobile devices in response to the wireless control signal, wherein Bluetooth and Near Field Communication (NFC) functionality of the electronic mobile device is not disabled;
    requesting an input via the one or more electronic mobile devices that satisfies a predetermined criterion, wherein the predetermined criterion comprises detecting the presence of a Bluetooth connection to a handsfree system of a vehicle;
    receiving the input that satisfies the predetermined criterion from at least one of the one or more electronic mobile devices;
    restoring radio frequency signal transmission of the at least one of the one or more electronic mobile devices;
    monitoring the movement of the electronic mobile device within the vehicle, wherein the step of monitoring comprises reading one or more inertial sensors of the electronic mobile device to determine that the electronic mobile device has been picked up; and
    in response to detecting movement of the electronic mobile device over a predetermined threshold via the one or more inertial sensors, the method further comprises the step of restricting or disabling input to the electronic mobile device, wherein disabling or restricting input to the electronic mobile device comprises disabling input via the display or buttons of the electronic mobile device, and wherein in response to detecting movement of the electronic mobile device, the electronic mobile device issues a warning or alert.

12. The method of claim 11, the method further comprising the steps of:
connecting the mobile device controller to an Onboard-Diagnostics (OBD) port of a vehicle; and
the mobile device controller reading a vehicle status code of the vehicle from the OBD port.

13. The method of claim 12, the method further comprising the steps of:
wirelessly transmitting the vehicle status code to the electronic mobile device via Bluetooth; and
in response to receiving the vehicle status code, the restoring step being executed.

14. The method of claim 11, wherein the alert or warning comprises an audio alert.

* * * * *